Shaler. v. Barlow.
Horse Rake.

No. 83,000.  Patented Oct. 13. 1868

Witnesses.
Wm. A. Morgan
G. C. Cotton

Inventor.
G. C. Shaler
H. Barlow.
per Munn & Co
Attorneys

GEORGE C. SHALER, OF GILBOA, AND HARRY BARLOW, OF HOBART, NEW YORK.

Letters Patent No. 83,000, dated October 13, 1868.

IMPROVEMENT IN HORSE-RAKES.

The Schedule referred to in these Letters Patent and making part of the same.

*To all whom it may concern:*

Be it known that we, GEORGE C. SHALER, of Gilboa, in the county of Schoharie, and State of New York, and HARRY BARLOW, of Hobart, in the county of Delaware and State of New York, have invented a new and improved Horse Hay-Rake; and we do hereby declare that the following is a full, clear, and exact description thereof, which will enable others skilled in the art to make and use the same, reference being had to the accompanying drawings, forming a part of this specification.

The present invention relates to a new and useful improvement in horse hay-rakes, the object of which is to rake and dump the hay or grain in heaps without scattering, and at the same time to keep the teeth of the rake clean and free from being clogged or choked; the construction and operation of which will be clearly understood from the following description, reference being had to the accompanying drawings, forming part of this specification, in which—

Similar letters of reference indicate corresponding parts.

In this case, the driver stands on the platform $a$, which is placed directly over and attached to the axle $b$.

Figure 2:
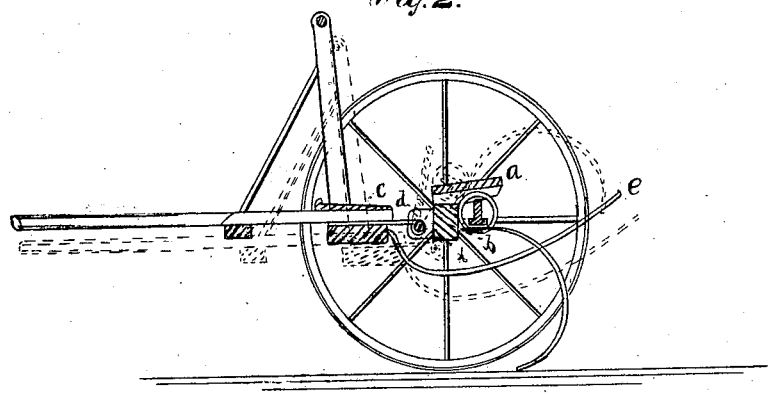
Figure 2 is a sectional elevation of the same through the line $x\ x$.
Figure 1:
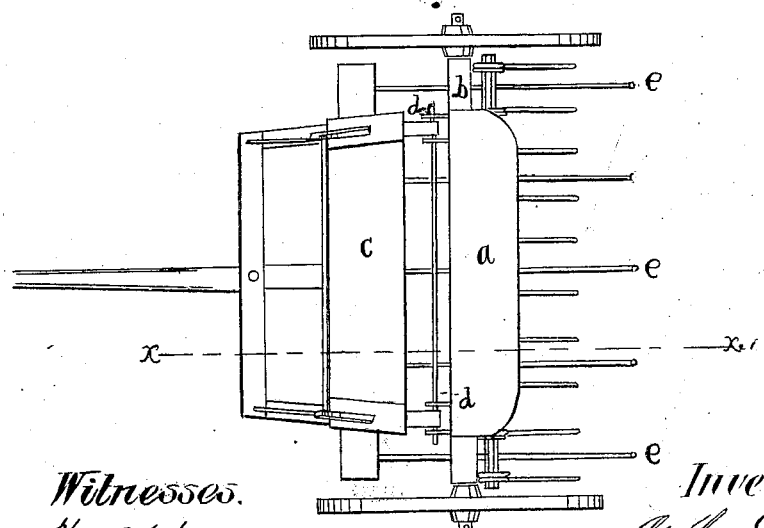
Figure 1 represents a plan of our improved horse hay-rake.

The rake-teeth are shaped as shown in fig. 2 of the accompanying drawing, and are secured firmly to the axle-tree by means of nuts and screws, or other suitable device.

From the peculiar shape of the rake-teeth it will be seen that they will hold a large quantity of hay, and instead of dumping and dragging the hay by the old method, our rake holds the hay gathered in a bunch, and is also discharged clean from the rake in a bunch or heap by the driver stepping forward on the platform $c$, which extends across the thills which are hung in the standards $d\ d$, which are attached to and extend outward from the axle-tree. Thus, as the driver puts his weight on the platform $c$, it will cause the same to drop downward, and thus raise the rake, as shown in red outline in fig. 2.

The cleaners $e$ are attached to the thills, and while raking, their position will be near the top of the rake, between its teeth, and when in the act of dumping, they follow down between the rake-teeth, as shown in red outline, and throw the hay from the rake in a heap, without scattering or dragging the same.

Having thus described our invention,

What we claim as new, and desire to secure by Letters Patent, is—

The platform $a$, rigidly attached to the revolving axle $b$, in which the curved teeth are fixed, and the platform $c$ hung between the projections $d\ d$ of the axle-tree, and carrying the clearers $e$, as herein shown and described, whereby, as the driver steps from $a$ to $c$, the latter is depressed, the axle partially turned, and the teeth and clearers operated as set forth and shown.

GEO. C. SHALER.
HARRY BARLOW.

Witnesses for SHALER:
    BENJAMIN D. REYNOLDS,
    CHARLES A. PHELPS.

Witnesses for BARLOW:
    JAMES C. M. WILLIAMS,
    EDWARD HUGHES.